US012806456B2

(12) United States Patent
Stahl, Jr.

(10) Patent No.: US 12,806,456 B2
(45) Date of Patent: Nov. 24, 2026

(54) WRAP STRIP TUCK-IN APPARATUS

(71) Applicant: Specified Technology, Inc., Sommerville, NJ (US)

(72) Inventor: James P. Stahl, Jr., Princeton Junction, NJ (US)

( * ) Notice: Subject to any disclaimer, the term of this patent is extended or adjusted under 35 U.S.C. 154(b) by 114 days.

(21) Appl. No.: 18/884,629

(22) Filed: Sep. 13, 2024

(65) Prior Publication Data

US 2025/0144456 A1 May 8, 2025

Related U.S. Application Data

(60) Provisional application No. 63/538,112, filed on Sep. 13, 2023.

(51) Int. Cl.
*A62C 2/06* (2006.01)

(52) U.S. Cl.
CPC .................................... *A62C 2/065* (2013.01)

(58) Field of Classification Search
CPC ...................................................... A62C 2/065
See application file for complete search history.

(56) References Cited

U.S. PATENT DOCUMENTS 9,145,987 B2 * 9/2015 Muenzenberger ... H02G 3/0412
10,220,226 B2 * 3/2019 Foerg .................. F16L 55/1026
2006/0090411 A1 * 5/2006 Shaw ...................... E04B 1/948 52/233
2013/0118102 A1 * 5/2013 Pilz ......................... E04B 1/943 52/232
2015/0275507 A1 * 10/2015 Klein ...................... E04B 1/948 277/628
2017/0165509 A1 * 6/2017 Foerg ........................ F16L 5/04
2017/0314257 A1 * 11/2017 Foerg ........................ E04B 1/84

FOREIGN PATENT DOCUMENTS

DE 102011006211 A1 * 10/2012 ............. A62C 2/065

* cited by examiner

*Primary Examiner* — Theodore V Adamos
(74) *Attorney, Agent, or Firm* — Ryder, Mazzeo & Konieczny, LLC; Frank A Mazzeo, Esq.; Joseph M. Konieczny, Esq.

(57) ABSTRACT

A firestopping apparatus having an unexpanded configuration and an expanded configuration. The apparatus includes first and second intumescent strips connected with a fire-resistant material layer. Each intumescent strip has opposed end surfaces, opposed inner and outer edge surfaces, and opposed inner and outer core surfaces. The fire-resistant material layer has first and second opposed portions overlayed and affixed to at least one of the inner edge surfaces, outer core surfaces and outer edge surfaces of each strip, and has a central bridging portion fixed to and extending between the first and second strips to connect the strips in adjustable spaced relation relative to one another. The strips are arranged with the inner core surfaces abutting one another in the unexpanded configuration. The strips thermally react and expand in thickness to the expanded configuration when exposed to elevated temperature caused by a fire.

15 Claims, 6 Drawing Sheets

WRAP STRIP TUCK-IN APPARATUS

FIELD OF THE INVENTION

The present invention relates to apparatus for providing a firestop within a construction opening, and more particularly, to a firestopping apparatus configured to be positioned about a pipe and having intumescent strips connected to one another by an extendable fireproof material.

BACKGROUND OF THE INVENTION

It is commonplace in the construction and renovation of commercial and residential buildings to pass cables, conduits and the like through structural barriers such as walls, floors and ceilings. However, the presence of an opening through such barriers creates a potential hazard. In the event of a fire, that opening in the construction barrier provides a passageway through which fire can propagate from one side of the construction barrier to the other. When more than one unprotected opening exists, the fire can then spread to adjoining multiple areas of the building. As such, fire barriers are normally located within the openings and are designed to prevent the passage of fire through those openings.

When the opening surrounds a pipe, a common fire barrier comprises intumescent firestop wrap strips installed in the annular space between the pipe and the periphery of the opening in a fire-rated floor or wall. This method is commonly referred to as a "wrap strip tuck-in" since the wrap strip is tucked into the opening. This method typically has a low temperature rating because the wrap strip char is not encapsulated or contained. Once the intumescent material expands, the char is susceptible to falling out of the opening. As a result, this method often relies on the pipe eventually softening and enough intumescent material being left in the opening to collapse the pipe; however, this occurrence is not always reliable.

Collar systems are more reliable as fire barriers since the char is trapped by the steel restraining collar that is secured to the barrier by fasteners and washers. However, these systems are more expensive and requires a more time-consuming method to install than a tuck-in system, which is why contractors prefer not to use collar systems if they do not have to.

SUMMARY OF THE INVENTION

The present invention provides a firestopping apparatus having an unexpanded configuration and an expanded configuration, which is installed around a utility element, such as a pipe, traversing a structural barrier of a building, such as a floor, wall or ceiling, to prevent fire propagation. The apparatus is installed in the gap at the utility element/barrier interface so that fire cannot propagate through that gap from one side of the barrier to the other. As the gap gets bigger due to deterioration or collapse of the utility element, the apparatus expands into that void to insulate the entire gap. The apparatus has particular use with a non-metallic pipe.

The firestopping apparatus has a length, width, thickness, an unexpanded configuration and an expanded configuration. The apparatus generally comprises first and second strips of intumescent material connected by a layer of fire-resistant material. Each strip of intumescent material has opposed end surfaces defining the length of the strips and the apparatus, opposed inner and outer edge surfaces defining the width of the strips and the apparatus, and opposed inner and outer core surfaces defining the thickness of the strips.

The fire-resistant material layer has first and second opposed portions overlayed and affixed to at least one of the inner edge surfaces, outer core surfaces and outer edge surfaces of each strip. The material layer also has a central bridging portion fixed to and extending between the first and second strips to connect the strips in adjustable spaced relation relative to one another.

The strips are arranged with the inner core surfaces abutting one another in the initial, unexpanded configuration with the outer core surfaces defining the apparatus thickness extending therebetween. The strips thermally react and expand in thickness to the expanded configuration when exposed to elevated temperature caused by a fire.

The bridging portion and the interior core surfaces of the strips form a char pocket when the strips react and expand. The bridging portion is long enough so that the char formed at the outer edges of the strips during thermal reaction and expansion is encapsulated within the char pocket. In one preferred embedment, the bridging portion has a length larger than the apparatus thickness.

The bridging portion is folded over itself and lies flat in between the inner core surfaces of said strips in the unexpanded configuration. When the apparatus is exposed to a high temperature from a fire, the bridging portion exits the inner core surface interface and unfolds to form the char pocket in the expanded configuration. In this configuration, the bridging portion extends generally parallel to the inner edge surfaces in the expanded configuration.

In one preferred embodiment, the first and second portions of the material layer, and the bridging portion of the material layer, are continuously formed from a single fire-resistant material. The material layer may comprise a mesh fabric.

In one embodiment, the first and second portions of the material layer overlap and are adhered to the outer edge surfaces of said strips. In another embodiment, the first and second portions of the material layer also overlap and are adhered to the outer core surfaces of the strips. In yet another embodiment, the first and second portions of material layer also overlap and are adhered to the inner edge surfaces of the strips.

In yet an additional embodiment, the firestopping apparatus includes a third intumescent strip having opposed end surfaces, opposed inner and outer edge surfaces, and opposed inner and outer core surfaces. In this embodiment, the material layer overlaps and is adhered to at least the inner edge surface of the third strip.

BRIEF DESCRIPTION OF THE DRAWINGS

The accompanying drawings, which are incorporated herein and constitute part of this specification, illustrate preferred embodiments of the invention, and, together with the general description given above and the detailed description given below, serve to explain the features of the invention.

DETAILED DESCRIPTION OF PREFERRED EMBODIMENTS

Figure 1:
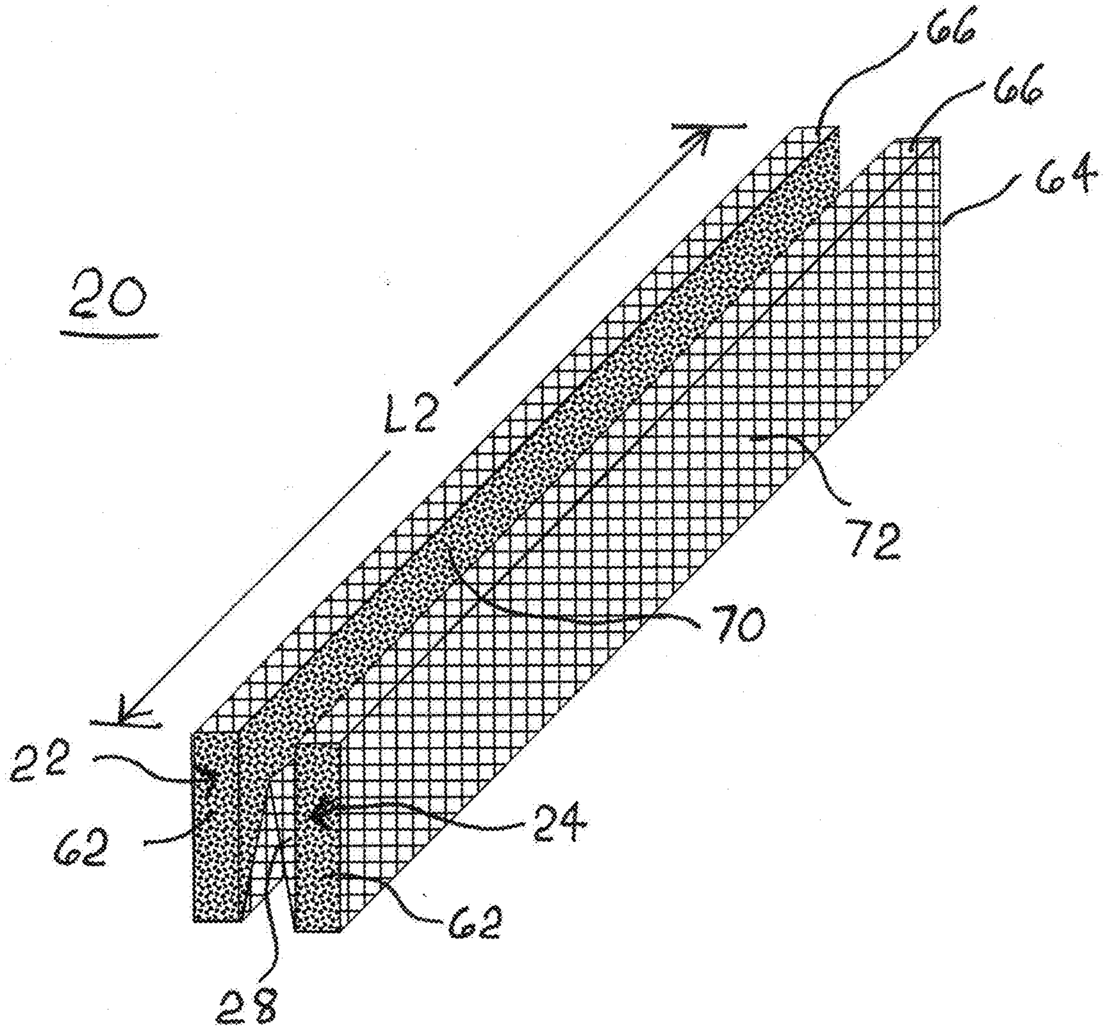
FIG. 1 is an isometric view of a firestopping apparatus in accordance with an embodiment of the invention.

The invention is described with reference to FIGS. 1-14, and the corresponding non-limiting examples, wherein like reference numerals refer to like elements. Reference to "one embodiment" or "an embodiment" means that a particular feature, structure or characteristic described therein is included in at least one embodiment. Thus, the appearances of the phrase "in a preferred embodiment" or "in an embodiment" appearing in various places throughout the specification are not necessarily referring to the same embodiment.

Figure 14:
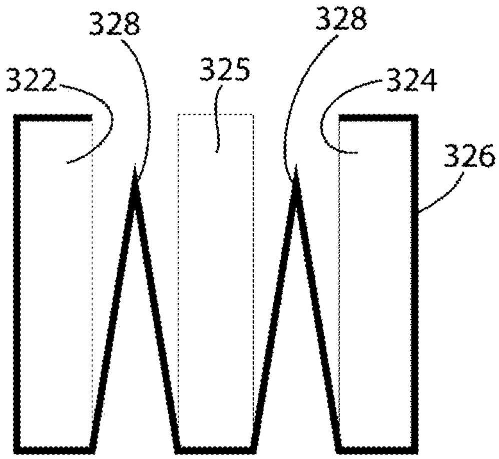

A firestopping apparatus in accordance with one preferred embodiment of the invention is shown in FIGS. 1-11 and is designated generally by reference numeral 20. The firestopping apparatus 20 generally comprises a pair of intumescent strips 22, 24 interconnected by a material layer 26. While the embodiment shown in FIG. 2 includes two strips, other embodiments including more than two strips with multiple bridging portions 28, such as shown in FIG. 14, are encompassed within the scope of the invention.

Figure 3:
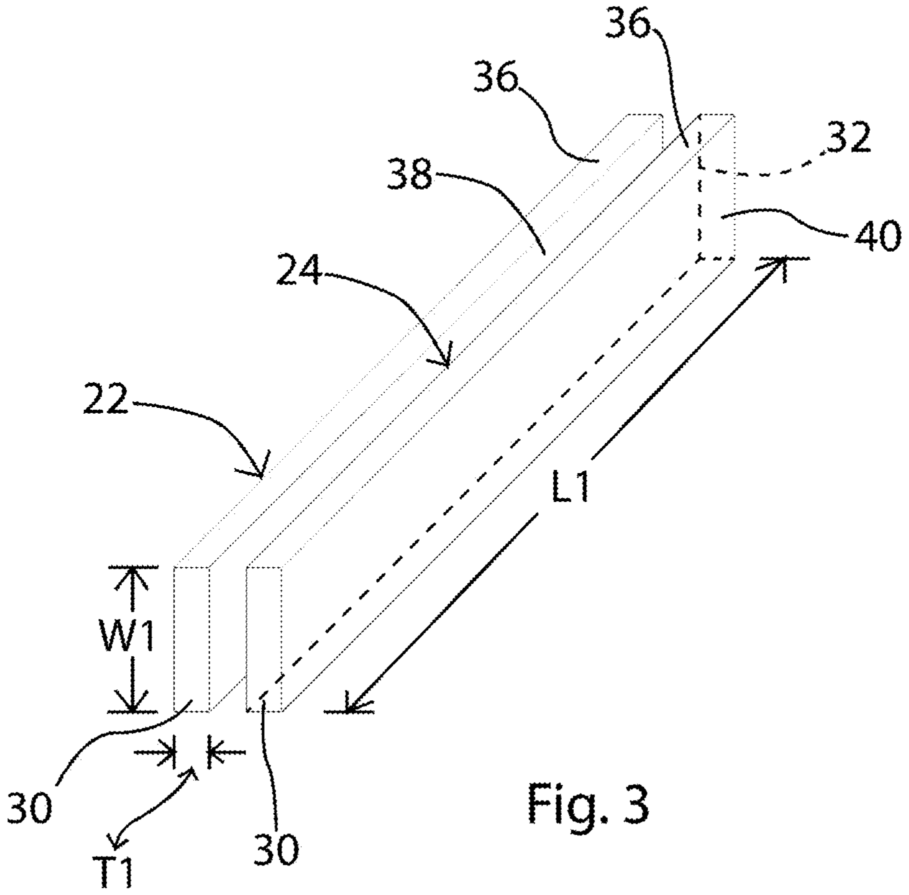
FIG. 3 is an isolated, isometric view of the intumescent strips of the apparatus of FIG. 1.
Figure 4:
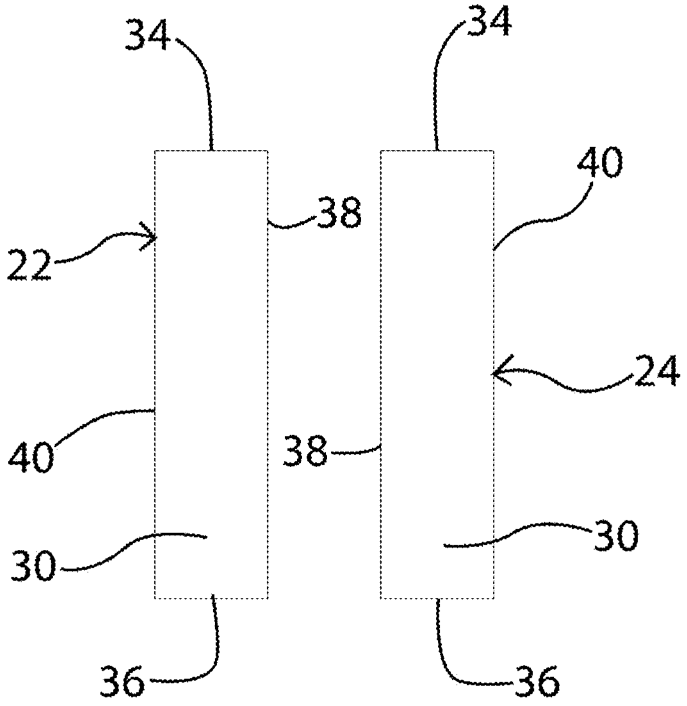
FIG. 4 is an end elevation of the intumescent strips of the FIG. 3.

The strips of intumescent material are shown in isolation in FIGS. 3 and 4. Each strip 22, 24 has first 30 and second 32 end surfaces, inner 34 and outer 36 edge surfaces, and inner 38 and outer 40 core surfaces. The terms "inner" and "outer" are used with reference to the intended use of the apparatus 20 described below. In preferred embodiments, the strips 22, 24 are arranged so that the inner core surface 38 of one strip 22 faces the inner core surface 38 of the other strip 24 with a portion separated by a fold of material layer 26 sandwiched in between.

Figure 5:
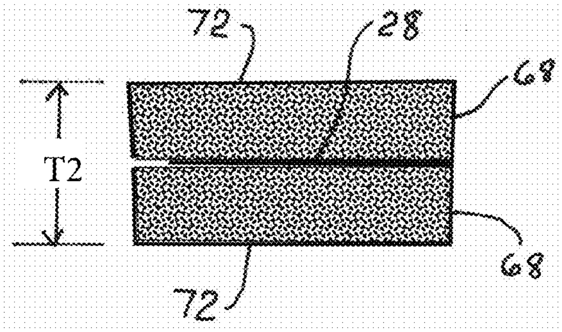
FIG. 5 is a side elevation view of the firestopping apparatus of FIG. 1 in its unexpanded configuration.
Figure 7:
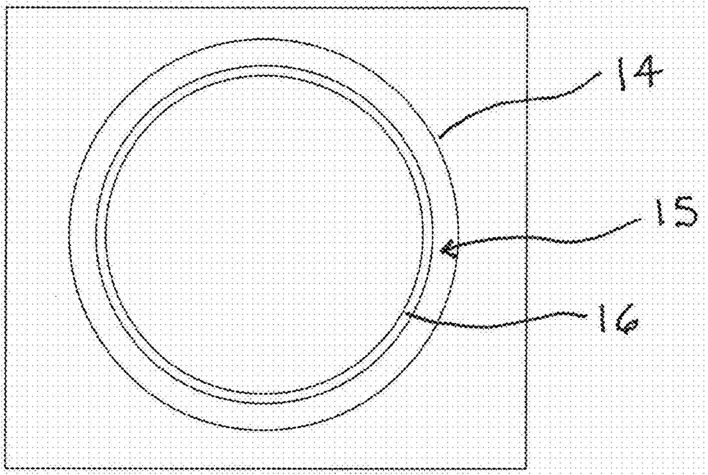
Fig. 7 (Prior Art)
FIG. 7 is a schematic elevation illustrating a prior art structural barrier with a pipe extending through an opening in the barrier.
Figure 8:
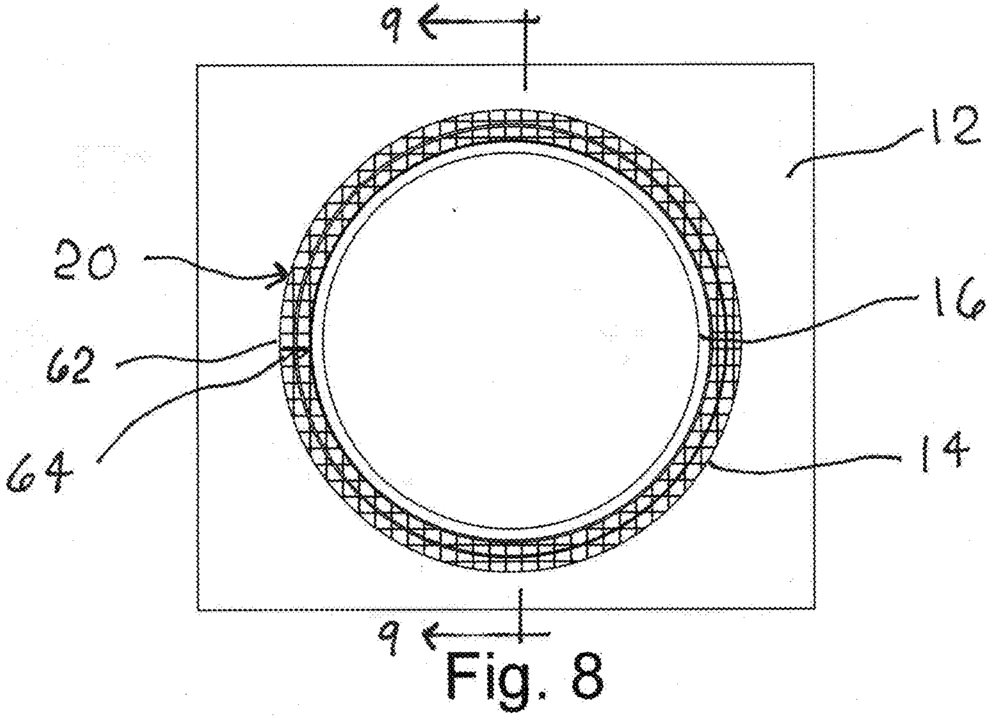
FIG. 8 is a schematic elevation of FIG. 7 with an unexpanded firestopping apparatus tucked into the gap between the barrier opening and the pipe.
Figure 9:
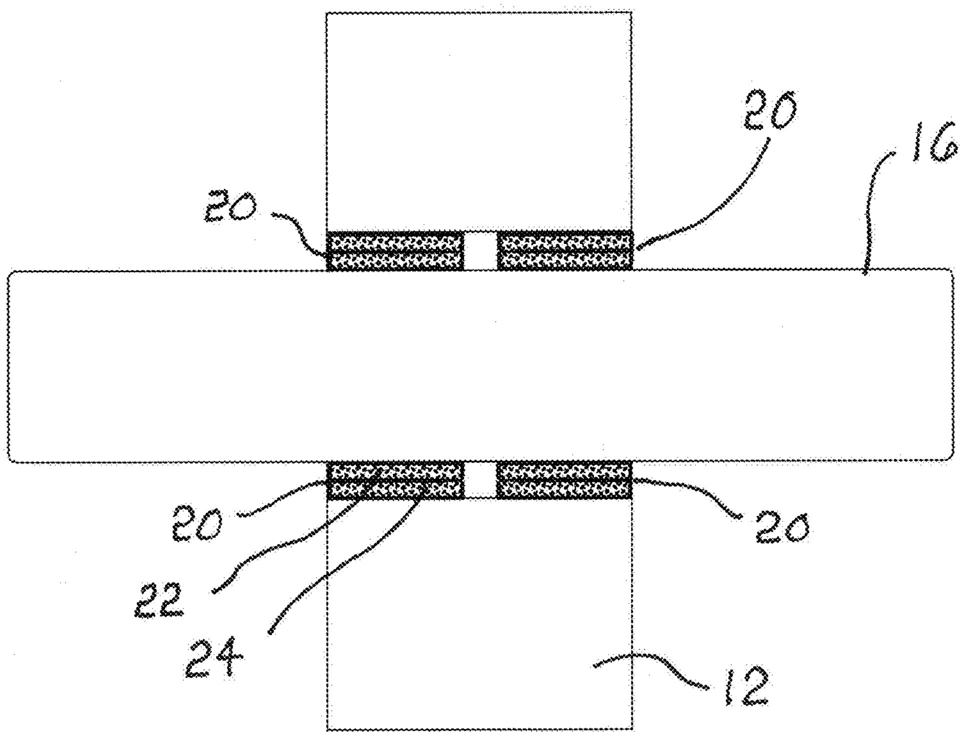
FIG. 9 is a cross-section taken along line 9-9 of FIG. 8.

Each strip has a length L1, a width W1, and a thickness T1. In one preferred embodiment, the length, width and thickness of each strip 22, 24 are the same as those of the other. In other embodiments, some or all of the dimensions of the first strip 22 may be different than the corresponding dimensions of the second strip 24. Additionally, while the strips 22, 24 are each illustrated with a generally-rectangular shape, other shapes may be utilized without departing from the scope of the invention. Moreover, as best seen in FIG. 5, one or more of the inner edge surfaces 34 and/or one or more of the outer edge surfaces 36 may be tapered such that the apparatus 20 has a taper from the outer core surface 72 of one strip 22 to the outer core surface 72 of the other strip 24. The taper acts to maintain the apparatus 20 in its initial installed position in the annular gap 15 between the outer surface of a pipe 16 and the inner surface of a circular opening 14 in a structural element 12 such as a floor, wall or ceiling as shown in FIGS. 7-9.

The strips 22, 24 are made from an intumescent material that react and expand upon exposure to heat above a threshold level, for example, but not limited to, above 175° C. Preferably, the width W1 of each strip 22, 24 is larger than its thickness T1 for use in the most common applications; however, for other applications, the width W1 may be equal to or less than the thickness T1. In one exemplary embodiment, each strip 22, 24 has a thickness T1 of about 0.25 inch and a width W1 of about 1.0 to 2.0 inches.

The intumescent strips 22, 24 are interconnected by a material layer 26 of flexible, fire resistant material. The apparatus 20 has a length L2, a width W2, and a thickness T2 in its unexpanded and unreacted condition as shown in FIGS. 1-2 and 5-6. The length L2 is approximately equal to the circumference of the pipe 16 around which the apparatus 20 is installed such as shown in FIG. 8. While the apparatus 20 is illustrated with the desired length, it should be appreciated by those of ordinary skill in the art that the apparatus 20 may be provided with a longer length and a portion cut to a desired length for use.

The apparatus has first 62 and second 64 end surfaces, inner 66 and outer 68 edge surfaces, and inner 70 and outer 72 core surfaces. In the embodiment shown in FIGS. 1-11, the material layer 26 is applied and adhered to the inner edge surfaces 34, outer edge surfaces 36, and outer core surfaces 40 of the strips 22, 24, while the inner core surfaces 38 and end surfaces 30, 32 are uncovered. In other embodiments, the material layer 26 is adhered, or otherwise fastened, to one or more of the surfaces 34, 36, and 40 of each strip 22, 24. Since the material layer 26 has minimal thickness, the thickness T2 of the apparatus 20 is substantially equal to the combined thickness T1 of the two strips 22, 24 and the width W2 is substantially equal to the width W1 of the strips 22, 24.

As explained below, the material layer 26 should not cover the inner core surfaces 38. Otherwise, the material layer would inhibit expansion of the intumescent strips 22, 24 as described below. Moreover, the material layer is not needed on the end surfaces 30, 32. Therefore, in this preferred embodiment, the end surfaces 30, 32 of the strips 22, 24 are the same as the end surfaces 62, 64 of the apparatus 20, and the inner core surface 38 of the strips 22, 24 are the same as the inner core surfaces 70 of the apparatus 20.

The material layer 26 could be adhered using known adhesives, tapes or fasteners. Alternatively, the strips 22, 24 could be cast in a die lined with the material layer 26 so that the strips 22, 24 form a mechanical, interstitial connection/fusion with the material layer 26. In preferred embodiments, the strips 22, 24 are arranged so that the inner core surface 38 of one strip 22 faces the inner core surface 38 of the other strip 24.

Figure 6:
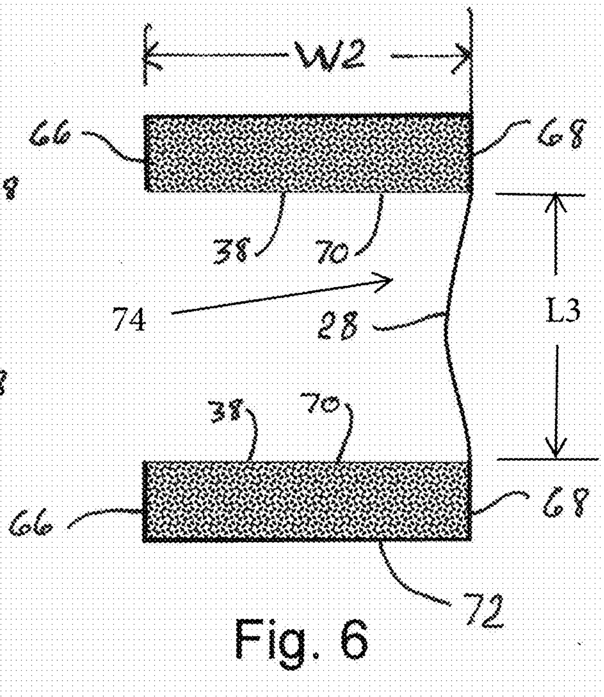
FIG. 6 is a side elevation of the firestopping apparatus of FIG. 1 with the intumescent strips spread apart to illustrate the bridging portion of the material layer.
Figure 10:
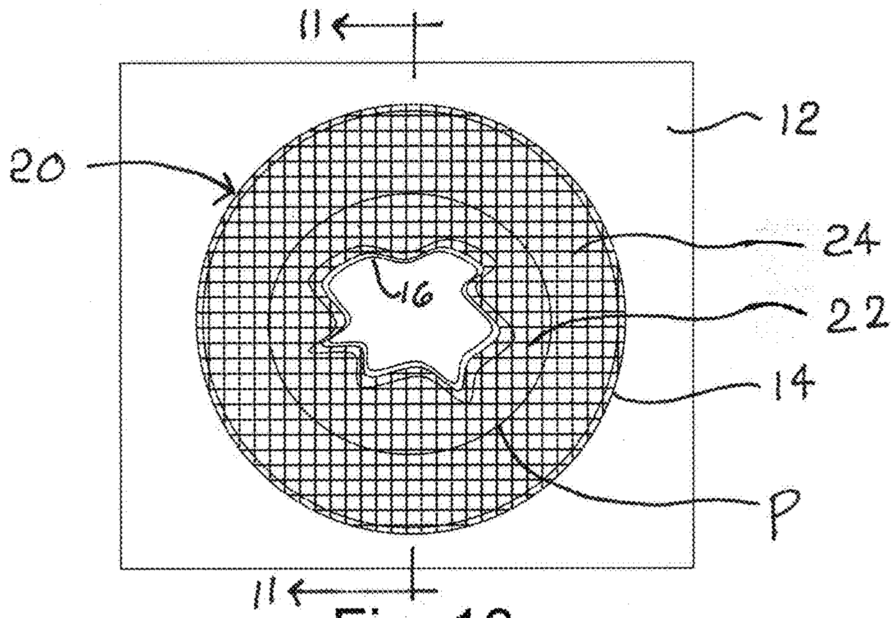
FIG. 10 is a schematic elevation similar to FIG. 8 with the firestopping apparatus in a heat-activated, expanded configuration.
Figure 11:
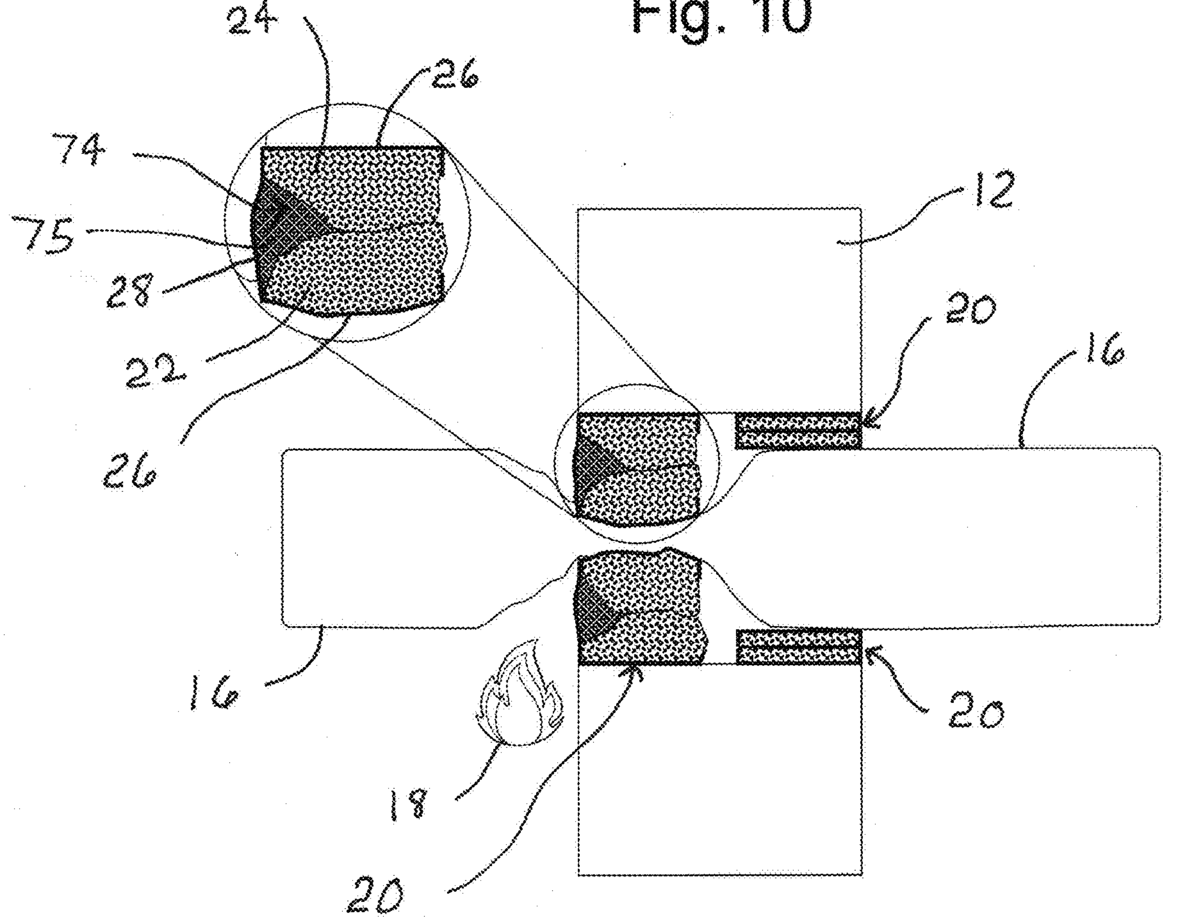
FIG. 11 is a cross-section taken along line 11-11 of FIG. 10.

The material layer 26 also includes a bridging portion 28 that is not adhered to any strip surface but is connected to each strip 22, 24. In one preferred embodiment, the bridging portion 28 extends between the outer edge surfaces 68, as best seen in FIG. 6. In preferred embodiments, the bridging portion 28 is fixed to and extends along the entire length of the inner edge surface 68. The length L3 of the bridging portion 28, which is approximated in FIG. 6, should be great enough to capture the fire-expanded char 75 of the strips 22, 24 such as illustrated in FIG. 11. In the embodiment shown in FIGS. 1-11, the material layer 26 covering the strips and the bridging portion 28 is a continuous layer of fabric.

Figure 2:
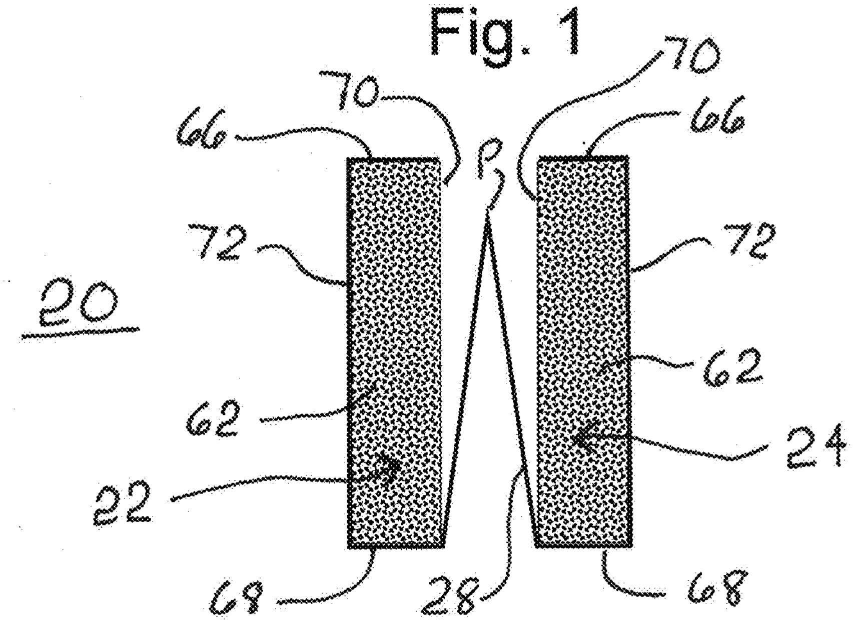
FIG. 2 is an end elevation of the firestopping apparatus of FIG. 1 in a partially open position to illustrate the folded bridging portion of the material layer.

To enable unobstructed expansion during a fire, the bridging portion 28 is folded to form pleats "P" and is sandwiched in between the inner core surfaces 70 of the apparatus 20 as shown in FIG. 2. For greater illustration of the folded bridging portion 28, FIGS. 1 and 2 show the apparatus 20 with the strips slightly separated but without intumescent expansion/reaction of the strips 22, 24. In one preferred embodiment, the bridging portion 28 is folded once to form a "V" shaped pleat as best seen in FIG. 2. In other embodiments, the bridging portion 28 could be folded twice to form a "W" shaped pleat, or multiple times to form multiple, repeating accordion-shaped pleats, as best seen in FIG. 14.

FIG. 6 shows the extent to which the strips 22, 24 can be separated before being restrained by the bridging portion 28. As described below, the bridging portion 28 and inner surfaces 70 define a char pocket 74 into which char 75 accumulates and is encapsulated when the intumescent strips 22, 24 are exposed to high heat.

The material layer 26 is preferably manufactured from a flexible, fire-resistant material or mesh. As used herein, the term "flexible" means that the material may be folded without significantly diminishing the structural integrity thereof. The term "fire-resistant" means the material has a melting or flame temperature that is significantly higher than the activation temperature of the intumescent material, for example, at least twice as high. In one embodiment, the material 26 is a glass fiber scrim; however, other materials may be utilized.

FIGS. 5, 8 and 9 show the apparatus 20 in an unexpanded/unreacted configuration. In this initial configuration, the inner core surfaces 70 of the strips 22, 24 are positioned adjacent to one another with the bridging portion 28 of the material layer 26 folded therebetween. In this initial configuration, the firestopping apparatus 20 is positioned or tucked within the gap 15 formed between the outer surface of the pipe 16 and the inner surface of the barrier opening 14 extending through a structural element 12 such as a wall, floor or ceiling as seen in FIGS. 8 and 9. The outer edge surfaces 68 must project away from the wall 12 while the inner edges 66 project toward the inside of the wall. In preferred embodiments, the thickness T2 of the apparatus 20 is slightly larger than the width of the annular gap 15 so that the apparatus 20 can be easily wrapped around the pipe, tucked into the gap 15, and held in place by an interference fit. Alternatively, one or both of the outer core surfaces 72 may be provided with adhesive or the like to secure the apparatus 20 to the outer surface of the pipe 16 and/or the inner surface of the opening 14. Preferably, the length L2 of the apparatus 20 is equal to the circumference of the pipe 16 so that the first and second end surfaces 62, 64 abut.

Thermal reaction and expansion of the intumescent strips 22, 24 is enabled by a softening and eventual collapse of the pipe 16. Referring to FIGS. 10 and 11, during a fire, non-metallic pipe materials soften greatly when exposed to high heat. At around the same time the pipe 16 begins to soften, the intumescent strips 22, 24 begin to expand and exert a radially-inwardly-projecting force around the entire circumference of the pipe 16. As the pipe collapses, the gap 15 enlarges and provides expansion space for the strips 22, 24. Without the firestopping apparatus 20, the enlarged gap 15 caused by pipe collapse would provide a portal through which fire could propagate through the wall 12 to an adjacent room. The char 75 and expanded strips 22, 24 fill and insulate the enlarged gap 15 to prevent fire propagation.

FIG. 9 shows the apparatus 20 in mid to near thermal reaction and expansion; however, the length of the bridging portion 28 is such that the apparatus 20 can continue to expand to completely seal the opening when the pipe completely collapses. To ensure this functionality, the bridging portion 28 should preferably have a length L3 equal to or greater than the radius of the pipe 16 on which the apparatus 20 is installed. As noted above, the bridging portion 28 may have more than one fold to accommodate this desired bridging portion length.

Figure 12:
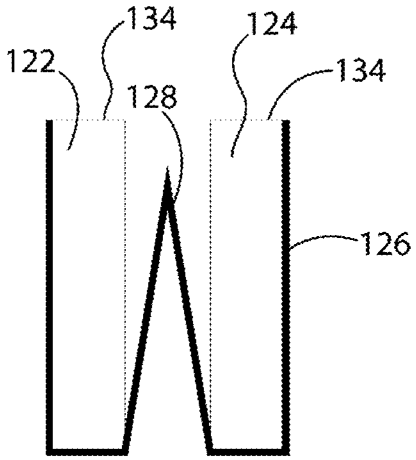
FIG. 12 is an end elevation of a firestopping apparatus in accordance with another embodiment of the invention in a partially open position to illustrate the folded bridging portion of the material layer.

Another embodiment of the firestopping apparatus is shown in FIG. 12 and is designated generally by reference numeral 120. The apparatus 120 is similar in construction, operation and use to the apparatus 20 described above with respect to FIGS. 1-11 except the material layer 126 is not adhered to the inner edge surfaces 134 of the strips 122, 124.

Figure 13:
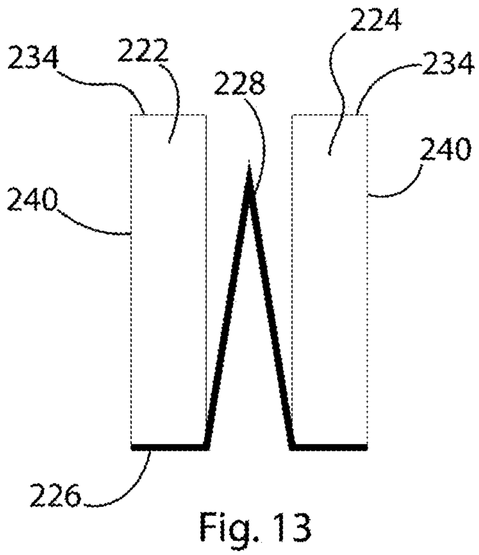
FIG. 13 is an end elevation of a firestopping apparatus in accordance with yet a further embodiment of the invention in a partially open position to illustrate the folded bridging portion of the material layer; and, FIG. 14 is an end elevation of a firestopping apparatus in accordance with an additional embodiment of the invention in a partially open position to illustrate the folded bridging portion of the material layer.

A further embodiment of the firestopping apparatus is shown in FIG. 13 and is designated generally by reference numeral 220. The apparatus 220 is similar in construction, operation and use to the apparatus 20 described above with respect to FIGS. 1-11 except the material layer 226 is not adhered to the inner edge surfaces 234 or the outer core surfaces 240 of the strips 222, 224.

An additional embodiment of the firestopping apparatus is shown in FIG. 14 and is designated generally by reference numeral 320. The apparatus 320 is similar in construction, operation and use to the apparatus 20 described above with respect to FIGS. 1-11 except the apparatus 320 includes a third intumescent strip 325 connected to the material layer 326. This apparatus 320 has use when the annular gap 15 is large and requires a much thicker apparatus than illustrated in FIGS. 1-11. The apparatus 320 includes a third strip that thermally reacts and expands to fill and insulate the large annular gap 15.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as defined in the claims.

Although the invention has been illustrated by reference to specific embodiments, it will be apparent that the invention is not limited thereto as various changes and modifications may be made thereto without departing from the invention scope. The various embodiments are intended to be protected broadly within the spirit and scope of the appended claims. The terms and expressions have been used as terms of description and not limitation. There is no limitation to use the terms or expressions to exclude any equivalents of features shown and described or portions thereof.

The invention claimed is:

1. A sealed pipe assembly comprising:

a. a building structure division;

b. a pipe extending through a passage in the building structure division;

c. an annular gap between the pipe and the passage;

d. a firestopping apparatus installed around the pipe in the annular gap, said apparatus having a length, width, thickness, an unexpanded configuration and an expanded configuration, having:

i. first and second strips of intumescent material, each strip having opposed end surfaces defining the length of said strips and said apparatus, opposed inner and outer edge surfaces defining the width of said strips and said apparatus, and opposed inner and outer core surfaces defining the thickness of said strips and said apparatus, said strips being arranged with said inner core surfaces abutting one another in the unexpanded configuration; and, ii. a fire-resistant material layer having first and second opposed portions overlayed and affixed to at least one of said inner edge surfaces, outer core surfaces and outer edge surfaces of each strip, and having a central bridging portion fixed to and extending between the outer edge surfaces of said first and second strips to connect said strips in adjustable spaced relation relative to one another, wherein said apparatus is installed in said annular gap with the inner edge surfaces facing inward towards said building structure division and with the outer edge surfaces facing outwards away from said building structure division so that the bridging portion of said fire-resistant material layer and the interior core surfaces form a char pocket in the expanded condition that controls and encapsulates the char formed at the outer edges of the strips when the pipe is exposed to elevated temperature caused by a fire.

2. The sealed pipe assembly recited in claim 1, wherein said bridging portion and said interior core surfaces of said strips form a char pocket when said strips react and expand.

3. The sealed pipe assembly recited in claim 2, wherein said bridging portion is long enough so that the char formed at the outer edges of said strips during thermal reaction and expansion is encapsulated within said char pocket.

4. The sealed pipe assembly recited in claim 2, wherein the bridging portion has a length larger than the apparatus thickness.

5. The sealed pipe assembly recited in claim 2, wherein said bridging portion is folded over itself and lies flat in between the inner core surfaces of said strips in the unexpanded configuration.

6. The sealed pipe assembly recited in claim 2, wherein the end portions of said material layer overlap and are adhered to the outer edge surfaces of said strips.

7. The sealed pipe assembly recited in claim 6, wherein the end portions of said material layer overlap and are adhered to the outer core surfaces of said strips.

8. The sealed pipe assembly recited in claim 7, wherein the end portions of said material layer overlap and are adhered to the inner edge surfaces of said strips.

9. The sealed pipe assembly recited in claim 2, including a third intumescent strip having opposed end surfaces, opposed inner and outer edge surfaces, and opposed inner and outer core surfaces.

10. The sealed pipe assembly recited in claim 9, wherein said material layer overlaps and is adhered to the inner edge surface of said third strip.

11. The sealed pipe assembly recited in claim 1, wherein said bridging portion exits the inner core surface interface and unfolds to form the char pocket in the expanded configuration.

12. The sealed pipe assembly recited in claim 11 wherein said bridging portion extends generally parallel to said inner edge surfaces in the expanded configuration.

13. The sealed pipe assembly recited in claim 1, wherein said first and second portions and said bridging portion of said material layer are continuously formed from a single fire-resistant material.

14. The sealed pipe assembly recited in claim 13, wherein said fire-resistant material comprises a mesh fabric.

15. A method of firestopping an annular gap surrounding a pipe extending through a passage in a building structure division, comprising the steps of;

a. providing a firestopping apparatus having a length, width, thickness, an unexpanded configuration and an expanded configuration, said apparatus comprising:

i. first and second strips of intumescent material, each strip having opposed end surfaces defining the length of said strips and said apparatus, opposed inner and outer edge surfaces defining the width of said strips and said apparatus, and opposed inner and outer core surfaces defining the thickness of said strips and said apparatus, said strips being arranged with said inner core surfaces abutting one another in the unexpanded configuration; and, ii. a fire-resistant material layer having first and second opposed portions overlayed and affixed to at least one of said inner edge surfaces, outer core surfaces and outer edge surfaces of each strip, and having a central bridging portion fixed to and extending between the outer edge surfaces of said first and second strips to connect said strips in adjustable spaced relation relative to one another, b. installing the firestop apparatus around the pipe in the annular gap with the inner edge surfaces facing inward towards the building structure division and with the outer edge surfaces facing outwards away from said building structure division; and, c. encapsulating and controlling the char formed at the outer edges of the strips when the pipe is exposed to elevated temperature caused by a fire by enabling the bridging portion of said fire-resistant material layer and the interior core surfaces to form a char pocket in the expanded condition.

* * * * *